United States Patent Office 3,463,743
Patented Aug. 26, 1969

3,463,743
POLYMERIC TITANIUM COMPOUNDS AND Ti-Al COMPLEXES
Richard R. Durst and Wendell O. Phillips, Stow, Ohio, assignors to The General Tire & Rubber Company, Akron, Ohio, a corporation of Ohio
No Drawing. Original application Sept. 9, 1963, Ser. No. 307,353, now Patent No. 3,312,637, dated Apr. 4, 1967. Divided and this application Jan. 16, 1967, Ser. No. 609,292
Int. Cl. B01j *11/84;* C07f *7/28;* C08g *35/00*
U.S. Cl. 252—431                                            8 Claims

ABSTRACT OF THE DISCLOSURE

A benzene-soluble reaction product is obtained by reacting at a temperature of from about 30° to 110° C. under subatmospheric pressure approximately equimolar amounts of a compound of the formula $Ti(OR)_4$ in which R is an alkyl radical of no more than about 10 carbon atoms with a compound of the formula $TiX_4$ in which each X is a halogen atom, said reaction product containing at least one TiOTi linkage. This reaction product can further be reacted with $AlR_3$ to form a complex reaction product where R is an alkyl radical of up to 10 carbon atoms and where the mol ratio of Al to Ti is from 0.3:1 to 10:1. These products are useful in polymerizing epoxides like propylene oxide to make polyalkylene ethers of high molecular weight.

---

This application is a divisional application of our U.S. patent application, Ser. No. 307,353 filed Sept. 9, 1963 and entitled "Polymeric Titanium Compounds, Ti-Al Complexes and Their Use as Catalysts" now U.S. Patent No. 3,312,637, patented Apr. 4, 1967.

The present invention relates to dimeric and polymeric titanium halide alkoxides, method of making these compounds, complexes of these titanium compounds with aluminum trialkyls, and methods of polymerizing epoxides using these compounds and complexes as catalysts.

More specifically, this invention includes benzene-soluble reaction products of titanium tetraalkoxides and titanium tetrahalides wherein each of the reaction products contains at least one TiOTi linkage and preferably no more than about five TiOTi linkages, a method of preparing these reaction products by heating a mixture of the ingredients at temperatures up to about 110° C. under vacuum, complexes of these reaction products with aluminum trialkyls having molar ratios of Al to Ti ranging from about 0.3:1 to about 10:1, preferably from about 1:1 to about 6:1, and use of the titanium reaction products in conjunction with the polymerization of vicinal epoxides whereby the titanium reaction products can be used as sole catalysts but are preferably employed with aluminum trialkyls as preformed complex catalysts or as cocatalysts complexed in situ. The exact structures of the titanium reaction products and the complexes formed by these reaction products and aluminum trialkyls are not known. It has been found that vicinal epoxides such as propylene oxide can be polymerized by the use of these complexes as catalysts to polymers having inherent viscosities which are substantially higher, even 100% higher, than those obtained by the so-called "Ziegler" and "Natta" catalysts, which have generally produced polymers having inherent viscosities in the range of 0.4 to 1.

The titanium-based reaction products are produced by mixing in approximately equimolar amounts a compound of the formula $TiX_4$, in which each X is a halogen atom, preferably chlorine or bromine, with a compound of the formula $Ti(OR)_4$, in which each R is an alkyl radical of no more than about ten carbon atoms, and heating the mixture at temperatures from about 30° C. up to 110° C. under a vacuum, i.e., at subatmospheric pressure. The reaction between these two types of titanium compounds is generally exothermic causing a temperature rise in the reaction system to the range of 60 to 90° C. While any degree of vacuum promotes the desired reaction and product, it is desirable to have a vacuum of no more than about 20 mm. Hg absolute pressure and preferably in the range of about 1 to 2 mm. Hg absolute pressure. The products of this reaction have been found to range from deep red or red-orange liquids to gritty or sandy solids. The products of interest have been limited to those which range from liquids to wax-like solids and which are benzene-soluble. These benzene-soluble products have been found by analysis to contain halogen and Ti atoms in such ratios as to indicate the presence of polymeric structures, i.e., structures containing at least one TiOTi linkage. These products are therefore distinct from the purely monomeric materials disclosed in U.S. Patent 2,986,531.

The benzene-soluble titanium-based reaction products produced as described above have been found to be catalysts for the polymerization of vicinal epoxides, such as propylene oxide (known more formally as 1,2-epoxypropane), under conditions and with ingredients such as those set forth below. However, these reaction products are especially valuable as epoxide polymerization catalysts when used in conjunction with aluminum trialkyls of the general formula $AlR_3$ in which each R is an alkyl radical of no more than about ten carbon atoms. The titanium products and the aluminum compounds are mixed in such proportions as to produce a molar ratio of aluminum to titanium ranging from about 0.3:1 to about 10:1, preferably from about 1:1 to about 6:1 and most preferably about 2:1. Apparently a complex is formed which has optimum catalytic properties for epoxide polymerization. The combination of the titanium-based products and aluminum compounds has been found to be more active catalytically when prepared prior to introduction in an epoxy polymerization system than when prepared in situ in the epoxy polymerization system.

Each of the R radicals in both the aluminum trialkyls and the titanium tetraalkoxides can be any alkyl radical of from 1 to 10 carbon atoms such as, for example, the methyl, ethyl, propyl, isopropyl, butyl, isobutyl, amyl, isoamyl, hexyl, 2-ethylhexyl or decyl radical.

The epoxides to be polymerized include any epoxide having up to a total of 50 carbon atoms and having 1, 2, 3, 4 or more oxygen-carbon rings in which an oxygen atom is joined to 2 carbon atoms in the ring which will open and polymerize with the same or other epoxide monomers. These monomers can contain 1, 2, or more (preferably only 1) aliphatic carbon-to-carbon double bond. The alkenyl-, halogen-, nitro-, ether- and ester-substituted derivatives of these epoxides likewise can be employed.

The use of monomer mixtures having epoxide monomers containing aliphatic carbon-to-carbon double bond unsaturation in an amount of from about 0.5 to 20 mol percent, the balance being the saturated epoxide monomer, permits the resulting copolymer to be cured readily with materials such as sulfur and the like. A very useful mixture is one containing propylene oxide in an amount of from about 90 to 99.5 mol percent and allyl glycidyl ether, vinyl cyclohexene monoxide, or butadiene monoxide in an amount of from 10 to 0.5 mol percent to obtain a sulfur-vulcanizable copolymer. Minor amounts of from about 0.5 to 20 mol percent of a third, fourth or fifth monomer of from 4 to 12 carbon atoms such as, for example, 1,2-butene oxide or 2,3-hexene oxide, can be present to break up or substantially eliminate the crystallinity of the copolymer where desired, especially where only small amounts of an unsaturated monomer are needed and more flexibility in processing and molding are desired.

Exampes of epoxides which may be polymerized using the novel catalyst of this invention are ethylene oxide, propylene oxide, 1,2-butene oxide (or 1,2-epoxy butane), 2,3-butene oxide, 1,2-dodecene oxide, isobutylene oxide, 1,2-pentene oxide, isopentene oxide, styrene oxide, 1,2-diisobutylene oxide, 1,2-hexene oxide, 2,3-hexene oxide, 1,2-heptene oxide, 2,3-diisobutylene oxide, allyl glycidyl ether, isoheptene oxide, octene oxide, nonene oxide, decene oxide, henedecene oxide, 1,2-epoxy pentacosane, methyl glycidyl ether, ethyl glycidyl ether, heptacontene oxide, epichlorohydrin, vinyl cyclohexene monoxide, nitro ethylene oxide, phenyl glycidyl ether, butadiene dioxide, 3-methyl-3,4-epoxy butene-1, butadiene monoxide, vinyl cyclohexene dioxide, glycidyl methacrylate, 2,3-diisobutylene oxide, di-cyclopentadiene monoxide, limonene dioxide, isoprene monoxide, the diglycidyl ether of pentanediol, (3,4-epoxy-6-methyl cyclohexylmethylene)-3,4-epoxy-6-methyl cyclohexane carboxylate, the reaction product of the diglycidyl ether of pentanediol and bisphenol A, 1-epoxyethyl-3,4-epoxy cyclohexane, 1,4-dichloro-2,3-epoxy butane, allyl epoxy stearate, the reaction product of the diglycidyl ether of pentanediol and a polyalkylene and/or arylene ether glycol, and the like. Preferably, these epoxides have a total of from 2 to 25 carbon atoms. Of these materials, it is more preferred to use major amounts of the lower molecular weight monoepoxides containing an oxirane group and from 2 to 12 carbon atoms (such as, for example, ethylene oxide, propylene oxide and butylene oxide) with minor amounts (preferably 5 to 20 mol percent) of unsaturated monoepoxides containing from 3 to 12 carbon atoms (such as, for example, allyl glycidyl ether, butadiene monoxide and vinyl cyclohexene monoxide). Mixtures of these epoxides can also be used. The catalyst is useful, for example, in the manufacture of a terpolymer of propylene oxide, allyl glycidyl ether and phenyl glycidyl ether.

Where the epoxide monomer contains 2 or more vicinal epoxide groups, it may readily crosslink or gel in the presence of the catalyst of this invention to form a thermoset material. Such materials are very useful in forming potting compounds for delicate electrical and mechanical instruments. Conventional methods may be used to effect curing. Those compounds which have no ethylenic unsaturation may be cured in the usual manner with organic peroxides such as dicumyl peroxide. The polymers which have unsaturated groups may be cured more easily with sulfur or various other curing agents such as tetraethyl thiuram disulfide or other organic sulfur curing agents.

The complex described above is preferably used only in a sufficient amount to catalyze the polymerization reaction. The exact amount of catalyst is difficult to determine due to the difficulty in obtaining an exact molecular weight for the titanium product. However, the catalyst amount appears to range generally from about 0.1 to about 10 mol percent of catalyst complex based on the epoxide monomer. The preferred range is about 0.5 to about 4 mol percent of catalyst complex based on the epoxide monomer. It has been found that an increase in catalyst concentration from 0.5 to 1.5 mol percent increases polymer yield with time and an increase from 1.0 to 3.0 mol percent catalyst increases slightly the molecular weight of the polymer product from polymerization at 80° C.

The monomers can be polymerized with the catalyst in mass or bulk or in solvent, preferably with agitation of the reactants. More catalyst is usually employed in the solvent than in the bulk system to achieve the same ultimate polymer. To avoid the loss of volatile monomers and to avoid oxidation, the polymerization should be conducted in a closed container under pressure. The monomers preferably should be polymerized under dry, inert and/or non-oxidizing conditions (for example, under an atmosphere of nitrogen, argon, neon, helium, krypton or other inert or nonoxidizing atmosphere). It is sometimes desirable to polymerize in a dry solvent since this facilitates handling and operation. Alternatively, the inert gas can be omitted and the monomer polymerized in the solvent only under autogenous pressure from vaporized solvent or gaseous monomer. The monomer should be soluble in the solvent which should be an inert or non-reactive dry solvent. Examples of useful solvents are heptane, octane, cyclohexane, toluene, benzene, trimethylpentane, carbon tetrachloride, chloroform, diethyl ether and trichloroethylene. It is preferred to use non-polar hydrocarbon solvents. Polymerization can be conducted at temperatures of about 25° C. or even somewhat lower, but it is preferably conducted at elevated temperatures (i.e., 100° C.). It has been found that polymerizations at 25° C. produce higher molecular weight polymers but lower yields than, for example, polymerizations at 80° C.

In general, the catalyst (at room temperature or at a temperature lower than that at which it was prepared) is placed in the reactor, the monomer or monomer and solvent is added at room temperature, and heat is applied as necessary to effect polymerization. Alternatively, the catalyst can be added with the solvent to the monomer or epoxide. If the polymer dissolves in the solvent, it can be precipitated with a non-solvent and recovered or the solvent can be separated from the polymer by steam stripping.

The polymers and copolymers obtained by the method of the present invention usually have high average molecular weights (i.e., from about 100,000 to 500,000 or higher) as shown by their high viscosities. Such resinous and rubbery polymers and copolymers are useful as coatings for fabrics, films for packaging materials, elastic fibers or threads, adhesives, and in making tires, shoe heels, raincoats, printing rollers, garden hose, electric wire jackets, upholstery materials, floor mats, tiles, sponges, rubber shoes, golf balls, molded articles and encapsulating compounds.

The polymers can be compounded with the usual rubber and resinous compounding materials, such as curing agents, antidegradants, fillers, extenders, reinforcing agents, ultraviolet light absorbers, fire resistant materials, dyes, pigments, plasticizers, lubricants, other rubbers and resins. Examples of useful materials which can be compounded with these rubbers, resins and polymers are zinc oxide, stearic acid, sulfur, 2-mercaptobenzothiazole, bis (morpholyl) disulfide, bis(benzothiazyl) disulfide, bis (morpholyl) tetrasulfide, zinc dimethyl dithiocarbamate, tetramethyl thiuram disulfide, carbon black, $TiO_2$, iron oxide, calcium oxide, $SiO_2$ and $SiO_2$-containing materials, silicon monoxide, aluminum oxide, phthalocyanine blue or green, asbestos, mica, wood flour, nylon or cellulose fibers or flock, clay, barytes, dioctyl phthalate, tricresyl phosphate, non-migrating polyester plasticizers, phenyl beta-naphthylamine, pine oil, mineral oil, hydroquinone monobenzyl ether, mixtures of octylated diphenylamines, styrenated phenols, aldol-alpha-naphthylamine, diphenyl amine-acetone reaction products, antimony oxide, asphalt, coumarone indene resin, natural rubber, polyisoprene, cis-polybutadiene, polyacrcylate rubbers, butadiene-styrene rubber or resin, nitrile rubber, acrylonitrile-styrene resin, polyester and/or other urethanes, polyvinyl chloride, vinyl chloride-vinylidene chloride copolymers and mixtures thereof.

The catalyst of the present invention is particularly well suited for the polymerization of vicinal-epoxy hydrocarbons such as ethylene oxide, propylene oxide, epoxy butanes and other epoxy hydrocarbons disclosed, for example, in U.S. Patent 3,030,315. The catalyst may be employed to polymerize an alkylene oxide such as propylene oxide and a halogen-substituted alklene oxide such as epichlorohydrin. It can be used to polymerize a single vicinal epoxy hydrocarbon (one having the oxygen atom containing in an oxirane group) or an admixture of at least two different vicinal epoxy hydrocarbons. In polymerizing a mixture, it is usually preferred that one of the vicinal epoxy compounds be a lower olefin oxide such as ethylene oxide, propylene oxide, 1,2-epoxybutane, or 2,3-epoxybutane.

The time required for the polymerization reaction will, in general, vary depending upon the temperature, the nature of the epoxy reagents employed, the particular catalyst, the catalyst concentration, the type and amount of an inert liquid organic vehicle and other factors. The reaction time can be a few hours or may be several days.

The present invention permits the use of conventional amine-type antioxidants when polymerizing an epoxy compound such as propylene oxide or the like and thereby provides better polymers. Such antioxidants, heretofore, were not used during polymerization since they seemed to interfere with the polymerization. The conventional amine-type antioxidants which may be incorporated with the vic-epoxy compound and the titanium-aluminum catalyst includes diphenyl-p-phenylenediamine, phenyl-beta-naphthylamine, p-isopropyl diphenylamine, aldol-alpha-naphthylamine, octylated diphenylamines, dinaphthyl-p-phenylenediamine, dibetanaphthyl - p - phenylenediamine, N,N' - diphenyl - p - phenylenediamine, N - isopropyl-N' - phenyl - p - phenylenediamine, N - phenyl - N'-cyclohexyl - p - phenylenediamine, 4 - isopropylamino diphenylamine, alkylated diphenylamine, mixtures of the above, and the like.

The amounts of the phenyl-beta-naphthylamine or other amine-type antioxidant mixed with the monomers prior to or during polymerization may be substantially the same as are conventionally added when the polymerization is completed (i.e., at least 0.3 and usually 0.5 to 1.5 percent of the total weight of the monomers).

EXAMPLE I

Titanium tetrachloride was added dropwise to an equal molar amount of tetra-isopropyl titanate under nitrogen. The system temperature rose to 80° C. and was held at such temperature by heating while a vacuum of 1–2 mm. Hg absolute pressure was gradually applied (to remove the isopropyl chloride formed). The product was a very viscous liquid which could be dissolved in dry benzene and stored. The chemical analysis of the product showed 25.41 weight percent chlorine and 24.90 weight percent titanium. This analysis and the material balance for the product preparation indicate an empirical formula approximating $Ti_2Cl_3O(O-i-Pr)_3$. (If the isopropyl chloride is not removed, the resulting product is inactive in complex with aluminum triisobutyl.)

The reaction product was mixed with triisobutyl aluminum in amounts corresponding to the mol ratios of Al to Ti shown. The resultant products were employed as catalysts for the polymerization of propylene oxide in approximate amounts of from about 0.5 to about 3 mol percent based on the monomer. The runs were made in capped bottles under nitrogen with the following results:

TABLE I

| Mol Ratio Al/Ti | Approx. Mol. Percent Cat. | Polymerization Time, hours | Polymerization Temp., °C. | Percent Monomer Conversion | Inherent Viscosity [1] |
|---|---|---|---|---|---|
| 0.48/1 | 1 | 120 Plus 20 | 25 R.T. | 10.7 | 3.0 |
| 1.47/1 | 1 | Same | | 26.2 | 2.73 |
| 2.44/1 | 1 | Same | | 27.6 | 2.40 |
| 3.40/1 | 1 | Same | | 24.5 | 2.27 |
| 1.47/1 | 0.5 | 72 | [2] 80 | 43.8 | 1.08 |
| 1.47/1 | 1.5 | 72 | [2] 80 | 87.9 | 1.43 |
| 1.95/1 | 1.5 | 72 | [2] 80 | 86.9 | 1.42 |
| 2.44/1 | 0.5 | 72 | [2] 80 | 43.1 | 1.11 |
| 2.44/1 | 1.5 | 72 | [2] 80 | 87.9 | 1.47 |
| 1.43/1 [3] | 2 | 72 | 25 | 46.9 | 1.95 |
| 2.44/1 [4] | 3 | 72 | 25 | 61.0 | 1.96 |

[1] Inherent viscosities were measured at approximately 0.3 g./100 ml. benzene at 25° C.
[2] These polymerizations at 80° C. were done in benzene equal in volume to the amount of propylene oxide monomer.
[3] Prepared two weeks before use.
[4] Prepared immediately before use.

This complex was found to initiate and catalyze propylene oxide polymerization in amounts of, for example, about 0.5 to 3 mol percent total catalyst based on amount of propylene oxide monomer used.

EXAMPLE II

An equimolar mixture of titanium tetrachloride and tetraisopropyl titanate was heated under vacuum and distilled to produce a benzene-soluble reaction product containing 24.56 weight percent clorine and 24.66 weight percent titanium indicating an apparent empirical formula $Ti_nCl_{n+1}O_{n-1}(OiPr)_{n+1}$ in which $n$ has an average value between 2 and 3.

This reaction product was used as a cocatalyst with aluminum tri-isobutyl in a manner similar to that of Example I to polymerize propylene oxide for 72 hours at 80° C. The runs were made using benzene as a polymerization solvent in amounts equal to from 2.3 to 2.7 times the volume of propylene oxide. The results were as follows:

TABLE II

| Run | $Al(C_4H_9)_3$ (gms.) | Ti Reaction Product (gms.) | Al/Ti Mol Ratio | Approx. Mol. Percent Cat. | Percent Polymer Conver. | Inherent Viscosity [1] | Polymer Yield (gms.) |
|---|---|---|---|---|---|---|---|
| A | .595 | .711 | 0.82/1 | 1 | 43.1 | 1.15 | 12.5 |
| B | .992 | .237 | 4.1/1 | 1 | 53.8 | 1.69 | 15.6 |
| C | 1.340 | .533 | 2.5/1 | 1.5 | 73.1 | 1.90 | 21.2 |
| D | 1.190 | 1.422 | 0.82/1 | 2 | 84.9 | 1.36 | 24.6 |
| E | 1.983 | .474 | 4.1/1 | 2 | 76.9 | 2.26 | 22.3 |

[1] Measured at 25° C., 0.3 grams of polymer in 100 ml. of benzene.

What we claim is:

1. A benzene-soluble reaction product of the reaction at a temperature of from about 30 to 110° C. under subatmospheric pressure of approximately equimolar amounts of a compound of the formula $Ti(OR)_4$ in which each R is an alkyl radical of no more than about 10 carbon atoms and a compound of the formula $TiX_4$ in which each X is a halogen atom, said reaction product containing at least one TiOTi linkage.

2. The product of claim 1 wherein each R is an isopropyl radical and each X is a chlorine atom.

3. The method comprising mixing in approximately equimolar amounts a compound of the formula $Ti(OR)_4$ in which each R is an alkyl radical of no more than about 10 carbon atoms and a compound of the formula $TiX_4$ in which each X is a halogen atom and heating and maintaining the resultant mixture at a temperature of from about 30° C. up to about 110° C. at subatmospheric pressure.

4. The method of claim 3 wherein each R is an isopropyl radical and each X is a chlorine atom.

5. The method of making a complex reaction product comprising mixing a compound of the formula $AlR_3$ in which each R is an alkyl radical of no more than 10 carbon atoms with a benzene-soluble reaction product of the reaction at a temperature of from about 30 to 110° C. under subatmospheric pressure of approximately equimolar amounts of a compound of the formula $Ti(OR)_4$ in which each R is an alkyl radical of no more than about 10 carbon atoms and a compound of the formula $TiX_4$ in which each X is a halogen atom, said reaction product containing at least one TiOTi linkage, said mixture being in such a ratio that the molar ratio of Al to Ti ranges from 0.3:1 to 10:1.

6. The method of claim 5 wherein $AlR_3$ is aluminum triisobutyl, $Ti(OR)_4$ is titanium tetraisopropoxide, $TiX_4$ is titanium tetrachloride and the molar ratio of Al to Ti is in the range of 1:1 to 6:1.

7. The reaction product of a compound of the formula $AlR_3$ in which each R is an alkyl radical of no more than 10 carbon atoms with a benzene-soluble reaction product of the reaction at a temperature of from about 30 to 110° C. under subatmospheric pressure of approximately equimolar amounts of a compound of the formula $Ti(OR)_4$ in which each R is an alkyl radical of no more than about 10 carbon atoms and a compound of the formula $TiX_4$ in which each X is a halogen atom, said benzene-soluble reaction product containing at least one TiOTi linkage, said mixture being in such ratio that the molar ratio of Al to Ti ranges from 0.3:1 to 10:1.

8. The product of claim 7 wherein $AlR_3$ is aluminum triisobutyl, $Ti(OR)_4$ is titanium tetraisopropoxide, $TiX_4$ is titanium tetrachloride and the molar ratio of Al to Ti is in the range of 1:1 to 6:1.

References Cited
UNITED STATES PATENTS 2,986,531   5/1961   Schreyer.
3,277,131   10/1966   Schon et al. _____ 260—429.5

PATRICK P. GARVIN, Primary Examiner

U.S. Cl. X.R.

252—429; 260—2, 429.5